Patented Dec. 21, 1937

2,102,611

UNITED STATES PATENT OFFICE 2,102,611

DIHALOGEN BUTENES AND PROCESS FOR THEIR PREPARATION

Wallace H. Carothers, Arden, and Arnold M. Collins, Wilmington, Del., assignors to E. I. du Pont de Nemours & Company, Wilmington, Del., a corporation of Delaware No Drawing. Application September 2, 1933, Serial No. 688,030

25 Claims. (Cl. 260—162)

In a copending application of Carothers and Collins (Serial No. 490,538, filed October 22, 1930) now U. S. Patent No. 1,950,431, issued March 13, 1934, it is pointed out that new and valuable products can be obtained by the addition of halogen acids, particularly hydrogen chloride and hydrogen bromide to vinylacetylene. The principal primary products thus obtained from hydrogen chloride are chloro-2-butadiene-1,3, $CH_2=CCl—CH=CH_2$, and chloro-4-butadiene-1,2, $CH_2=C=CH—CH_2Cl$; from hydrogen bromide are obtained the corresponding compounds, bromo-2-butadiene-1,3 and bromo-4-butadiene-1,2. In either case the ratio of the two principal primary products is determined by the conditions of the reaction as is indicated in the application referred to above. These products may be referred to as monohydrochlorides and monohydrobromides of vinylacetylene.

This application is a continuation in part of the above-designated Carothers and Collins copending application.

The present invention is concerned with products resulting from the addition of two molecules of hydrogen halide to vinylacetylene or one molecule of hydrogen halide to the monohydrohalides referred to above. The principal products obtained thus are represented by the general formula, $CH_3CX=CH—CH_2X$, in which X represents a halogen atom. These are new compounds; they are exceedingly reactive and are useful as reagents for the preparation of a variety of compounds not otherwise easily prepared.

According to the teachings of the present invention, compounds of the general formula, $CH_3CX=CH—CH_2X$, are obtained by reacting vinylacetylene with HX or by reacting a compound of the formulas, $CH_2=C=CH—CH_2X$ or $CH_2=CX—CH=CH_2$, with HX. The reaction may be carried out under a great variety of conditions. For example, any of the reactants referred to may be mixed with the pure liquid hydrogen halide; the reactant and the hydrogen halide may be mixed in a mutual solvent such as acetic acid, ether, alcohol, etc. Or the hydrogen halide may be dissolved in water and the resulting aqueous solution brought into contact with the reactant preferably with shaking to promote mixing of the two layers. Catalysts may be used; and for this purpose certain metal halides, especially cuprous halides are very effective; but in general satisfactory results can be obtained without the use of catalysts. Increasing the amount and concentration of the hydrogen halide generally increases the speed of the reaction and forces it toward completion; raising the temperature has a similar effect. The use of superatmospheric pressure is likewise beneficial to accelerate and complete the reaction.

The general method referred to above is illustrated in more detail by the following examples.

Example 1

Fifty parts by weight of vinylacetylene are placed in a closed vessel together with 400 parts of concentrated hydrochloric acid. The temperature of the mixture is allowed to rise to about 40° C. and it is continuously agitated for 24 hours; the non-aqueous layer is then separated and distilled. There is obtained a small fraction boiling at about 55° to 90° C., the dichloro-2,4-butene-2 which constitutes the main fraction distills at 125° to 130° C.

Example 2

A tall, narrow reaction vessel is provided with two inlets for gas at the bottom and an overflow-outlet and receiver at the top. The vessel is filled nearly to the outlet with a mixture of 250 parts by weight of concentrated hydrochloric acid and 100 parts of cuprous chloride. The mixture is saturated with hydrogen chloride at 50° C. by passing gaseous hydrogen chloride into one of the gas inlet tubes. A stream of gaseous vinylacetylene is introduced through the other tube. The gas streams are adjusted so that no appreciable amount of unreacted gas escapes at the top of the vessel. An oil rapidly accumulates at the surface of the mixture and soon begins to flow continuously into the receiver. When a sufficient amount of this oil has accumulated, it can be washed with water and purified by distillation. It usually contains a small amount of chloro-2-butadiene-1,3 but otherwise it consists essentially of dichloro-2,4-butene-2.

Example 3

Two hundred and ten parts by weight of concentrated hydrochloric acid, 25 parts of cuprous chloride, and 88.5 parts of chloro-2-butadiene-1,3 are placed in a closed vessel and agitated at room temperature for 16 hours. The mixture is then steam distilled in vacuum; the distillate is separated from a small amount of water; dried with potassium carbonate and redistilled. The yield of dichloro-2,4-butene-2 is 90 per cent of the theoretical amount. The remaining 10 per cent is nearly all accounted for as unchanged chloro-2-butadiene-1,3 recovered in the final distillation.

Example 4

Fifty parts by weight of vinylacetylene are placed in a closed vessel with 240 parts of aqueous hydrobromic acid (sp. gr. 1.55) and 200 parts of moist cuprous bromide. The mixture is agitated for nine hours at room temperature, and then allowed to stand for twelve hours more. The oily layer is separated, washed with water, dried over calcium chloride, mixed with a little hydroquinone and distilled under diminished pressure in a stream of nitrogen. A considerable amount of vinylacetylene is recovered, and then two fractions are obtained: (1) bromo-2-butadiene-1,3 boiling at 42°–43° C./165 mm. and (2) dibromo-2,4-butene-2 boiling at about 73° C./23 mm.

Example 5

One hundred and four parts by weight of vinylacetylene are liquefied in a vessel surrounded by a cooling bath at about −70° C. One hundred and forty-two parts by weight of dry hydrogen bromide gas is passed into the hydrocarbon during the course of two hours. The mixture is then allowed to warm up gradually to room temperature. It is washed with water and dilute caustic solution, dried, and distilled under diminished pressure. Three fractions were collected: (1) bromo-2-butadiene-1,3 boiling at 46°–52° C./200 mm., (2) bromo-4-butadiene-1,2 boiling at 65°–70° C./200 mm., (3) dibromo-2,4-butene-2 boiling at 70°–74° C./22 mm. A considerable amount of viscous residue remains.

Example 6

Ten parts by weight of vinylacetylene and 36 parts of dry hydrogen bromide are liquefied with cooling in a pressure vessel. The temperature is maintained at about −60° C. for about 16 hours. Then the temperature is allowed to rise to about 25° C. After twenty-four hours the vessel is opened. The product is washed with water and dilute caustic solution, dried with calcium chloride, and distilled under diminished pressure. Most of the distillate segregates into two fractions: (1) dibromo-2,4-butene-2 boiling at 47°–53° C./8 mm. and (2) tribromo-2,2,4-butane boiling at about 70° C./8 mm. No monohydrobromide is obtained, but there is some undistillable material.

Example 7

Fifty-two parts by weight of vinylacetylene are placed in a pressure vessel together with 127 parts of 47% aqueous hydroiodic acid (sp. gr. 1.5) 8.3 g. of potassium iodide, and 9 g. of cuprous chloride. The mixture is shaken for 15 hours at room temperature and is then steam distilled. The heavy reddish oil in the distillate is separated and redistilled. Diiodo-2,4-butene-2 is then obtained as a yellow or reddish liquid boiling at 67–69° C. at 2 mm.

In this case also the monohydrohalides are intermediate products, but as compared with vinylacetylene they react quite rapidly with hydroiodic acid, and hence they are not obtained in appreciable amounts unless the acid used initially is very dilute or deficient in amount.

Additional physical properties of some of the compounds described in the above examples are:

Bromo-4-butadiene-1,2: B. P. 108°–112° C./760 mm., 64°–66° C./181 mm.; $D_4^{20}$ 1.4255; $N_D^{20}$ 1.5248.

Dibromo-2,4-butene-2: B. P. 168°–169° C./760 mm., 70° C./23 mm.; $D_4^{20}$ 1.8768; $N_D^{20}$ 1.5485.

Tribromo-2,2,4-butane: B. P. 200°–205° C./760 mm. about 70° C./8 mm.: $D_4^{20}$ 2.1446; $N_D^{20}$ 1.5564.

Dichloro-2,4-butene-2: B. P. 127°–129° C./756 mm., 61°–63° C./70 mm., 53°–54° C./50 mm.; $D_4^{20}$ 1.1591; $N_D^{20}$ 1.4724.

Iodo-4-butadiene-1,2: B. P. 43°–45° C./38 mm.; $D_4^{20}$ 1.7130; $N_D^{20}$ 1.5709.

Iodo-2-butadiene-1,3: B. P. 111°–113° C./760 mm.; $D_4^{20}$ 1.7278; $N_D^{20}$ 1.5616.

As the above examples illustrate, the action of hydrogen halides on vinylacetylene proceeds through a series of steps. In the first step compounds of the formulas, $CH_2=CX-CH=CH_2$ and $CH_2=C=CH-CH_2X$, are formed and the ratio of these two products can be controlled by catalysis in the manner already set forth in the copending application of Carothers and Collins referred to above. Either of these compounds is capable of reacting further with the hydrogen halide, but the first reacts much more rapidly than the second. If the hydrogen halide is present in sufficient amount and concentration, further reaction occurs with the formation of dihalogen butenes. If a high concentration of the hydrogen halide is present, reaction may proceed still further and produce a trihalogen butane.

In order to insure completion of the reaction, when reacting monovinylacetylene with aqueous hydrogen halide, it is preferred to use a temperature which is appreciably higher than that which favors the formation of the monohalide. The temperatures which favor the formation of the dihalide are above 20° C. although there will always be some dihalide produced below 20° C. In preparing the dihalides also it is preferable to use an excess of the acid, i. e., more than 2 moles of HX for one of vinylacetylene. In the dihalogen butenes described above the two halogen atoms in a given case are the same. It is obvious, however, that the process might be applied in such a manner as to introduce at the second stage a different acid than that introduced at the first stage. In this manner mixed compounds such as $CH_3(Br)=CH-CH=Cl$ may be prepared.

The dihalogen butenes which constitute the dihydro-halides of vinylacetylene are new and useful compounds. In the following examples their use is illustrated with reference to dichloro-2,4-butene-2, and it will be understood that similar results may also be obtained from the corresponding dibromo-butene.

The terminal halogen atom of dichloro-2,4-butene-2 is very reactive and it may be replaced by other groups by methods of double decomposition as indicated in the equation, $$CH_3CCl=CH-CH_2Cl + AM \rightarrow CH_3CCl=CH-CH_2A + MCl$$

In this reaction M represents a metallic radical, and A represents an acid radical.

Thus, when the dichloro compound is boiled with an aqueous alcoholic solution of sodium cyanide, it is converted into chloro-2-cyano-4-butene-2, a new compound whose properties are indicated in the table (Compound No. 1). This compound on being heated with water in the presence of a suitable catalyst, e. g., concentrated hydrochloric acid, is converted into the corresponding acid, chloro-4-penten-3-oic acid, (No. 2). The latter can be converted to the acid chloride, e. g., by heating it with thionyl chloride, and thence to the anilide (No. 3). The acid, chloro-4-penten-3-oic acid, when heated with alcohols is converted into corresponding esters. Thus, when the acid is refluxed with absolute ethyl alcohol in the presence of a little hydrogen chloride, it is converted to ethyl chloro-4-penten-3-oate (No. 4). When chloro-4-penten-3-oic acid is dissolved in cold concentrated sulfuric acid and then poured into water, it is converted into levulinic acid; and a new and convenient method is thus supplied for the preparation of this acid.

When dichloro-2,4-butene-2 is treated with alkali alcoholates or with caustic alkalies in alcohol solutions, it is converted into the corresponding ethers. Thus, when a solution of 1 mole of the dichloro compound in 5 moles of ethyl alcohol containing 1 mole of sodium ethylate is allowed to stand for three hours and then refluxed for one hour, and the water-insoluble material is separated, dried, and distilled, there is obtained a good yield of chloro-2-ethoxy-4-butene-2 (No. 5). Similarly, by allowing dichloro-2,4-butene-2 to stand with an equivalent amount of potassium hydroxide dissolved in methyl alcohol, there is obtained an excellent yield of chloro-2-methoxy-4-butene-2 (No. 6). In a similar manner, when dichloro-2,4-butene-2 is refluxed with a methyl alcoholic solution of phenol containing 1 mole of sodium methylate, a good yield of chloro-2-phenoxy-4-butene-2 (No. 7) is obtained.

When dichloro-2,4-butene-2 is heated with strong caustic alkalies, e. g., with solid powdered potassium hydroxide, it loses hydrogen chloride and is converted into chloro-2-butadiene-1,3 and into vinylacetylene, and these very useful compounds can conveniently be prepared by this method. On the other hand, when dichloro-2,4-butene-2 is treated with alkalies, especially mild alkalies, in the presence of water, the terminal chlorine atom is replaced by hydroxyl. Thus, when the dichloro compound is heated to 90° C. for eighteen hours with 2.5 times its volume of water containing 2 moles of sodium carbonate, an aqueous mixture is formed, from which, by extraction with ether and distillation, a good yield of the new alcohol, chloro-2-hydroxy-4-butene-2 (No. 8) is obtained. This alcohol shows the typical reactions of alcohols. It can be converted by the usual methods into esters, of which the 3,5-dinitrobenzoic ester (No. 9) is a crystalline solid melting at 72°–73° C.

The chloro-2-hydroxy-4-butene-2 can also be converted into ethers. For example, if it is heated with an equivalent amount of dichloro-2,4-butene-2 in the presence of potassium hydroxide the new ether, di-(chloro-2-butene-2-yl-4) ether (No. 10) is obtained.

In dichloro-2,4-butene-2 the terminal halogen atom is sufficiently mobile to react with Grignard reagents. When an ethereal solution of the dichloro compound is mixed with an ethereal solution of phenylmagnesium bromide, there is formed the new compound, chloro-2-phenyl-4-butene-2 (No. 11). A similar product is obtained by the action of dichloro-2,4-butene-2 on benzene in the presence of aluminum chloride and in this case considerable amounts of resinous products are formed as well. Dichloro-2,4-butene-2 also reacts directly with magnesium and furnishes a highly reactive unsaturated compound having the composition

[CH₃CCl=CH—CH₂—]₂.

Dichloro-2,4-butene-2 also reacts with halogens to form useful products, some of which are described in a copending application of Coffman, Serial No. 589,051, filed January 26, 1932, now U. S. Patent No. 1,964,720, issued July 3, 1934.

| Compound No. | Formula | B. P. (or M. P.) °C. | Density $D_4^{20}$ | Refractive index $N_D^{20}$ |
|---|---|---|---|---|
| 1 | CH₃CCl=CHCH₂CN | 81–83/18 mm. | 1.0702 | 1.4632 |
| 2 | CH₃CCl=CHCH₂COOH | 83–85/1 mm. | 1.2022 | 1.4713 |
| 3 | CH₃CCl=CHCH₂CONHC₆H₅ | M. P. 17–18 / M. P. 100–101 | White crystals from alcohol. | |
| 4 | CH₃CCl=CHCH₂COOC₂H₅ | 81–83/15 mm. | 1.0715 | 1.4502 |
| 5 | CH₃CCl=CHCH₂OC₂H₅ | 88–89/129 mm. | 0.9788 | 1.4392 |
| 6 | CH₃CCl=CHCH₂OCH₃ | 125–126/760 mm. | | |
| 7 | CH₃CCl=CHCH₂OC₆H₅ | 94/1 mm. | 1.1080 | 1.5378 |
| 8 | CH₃CCl=CHCH₂OH | 56.5/1 mm. | 1.1120 | 1.4687 |
| 9 | CH₃CCl=CHCH₂OCO-C₆H₃(NO₂)₂ | M. P. 72–73 | | |
| 10 | (CH₃CCl=CHCH₂)₂=O | 72–73/1 mm. | 1.108 | 1.4842 |
| 11 | CH₃CCl=CHCH₂C₆H₅ | 54–55/0.5 mm. | 1.0458 | 1.5289 |

The above description and examples are intended to be illustrative only. Any modification of or variation therefrom which conforms to the spirit of the invention is intended to be included within the scope of the claims.

We claim:

1. A product having the formula:

$$CH_3CX=CH—CH_2X$$

in which X is a halogen atom.

2. A product having the formula:

$$CH_3CCl=CH—CH_2Cl$$

3. A product having the formula:

$$CH_3CBr=CH—CH_2Br$$

4. A product having the formula:

$$CH_3CI=CH—CH_2I$$

5. The process of preparing a compound having the formula:

$$CH_3—CX=CH—CH_2X$$

in which X is a halogen atom, which comprises reacting monovinylacetylene and a hydrogen halide, the hydrogen halide being present in such proportion that one mol. of monovinylacetylene will react with two mols of hydrogen halide, and separating the dihalogen butene from the reaction mixture.

6. The process of preparing a compound having the formula:

$$CH_3CX=CH-CH_2X$$

in which X is a halogen atom, which comprises reacting monovinylacetylene and a hydrogen halide, the molecular amount of the hydrogen halide being at least twice that of the vinylacetylene.

7. The process of preparing a compound having the formula:

$$CH_3-CX=CH-CH_2X$$

in which X is a halogen atom, which comprises reacting a halogen-2-butadiene-1,3 with a hydrogen halide.

8. The process of claim 5, characterized in that the reaction takes place in an aqueous medium.

9. The process of preparing a compound having the formula:

$$CH_3CX=CH-CH_2X$$

in which X is a halogen atom, which comprises reacting monovinylacetylene and a molecular excess of a hydrogen halide in the presence of an aqueous catalyst containing a substantial amount of a cuprous halide, then separating the dihalogen butene from the reaction mixture.

10. The process of preparing a compound having the formula:

$$CH_3-CX=CH-CH_2X$$

in which X is a halogen atom, which comprises reacting a halogen-2-butadiene-1,3 with a hydrogen halide in the presence of an aqueous catalyst containing a substantial amount of a cuprous halide.

11. The process of preparing a compound having the formula:

$$CH_3CCl=CH-CH_2Cl$$

which comprises reacting monovinylacetylene with a molecular excess of hydrogen chloride, then separating the dichloro butene from the reaction mixture.

12. The process of preparing a compound having the formula:

$$CH_3CCl=CH-CH_2Cl$$

which comprises reacting monovinylacetylene with hydrogen chloride, the hydrogen chloride being present in such proportion that one mol. of monovinylacetylene will react with two mols of hydrogen chloride.

13. The process of preparing a compound having the following formula:

$$CH_3CCl=CH-CH_2Cl$$

which comprises reacting chloro-2-butadiene-1,3 with hydrogen chloride.

14. The process of claim 10, characterized in that the reaction takes place in an aqueous medium.

15. The process of preparing a compound having the formula:

$$CH_3CCl=CH-CH_2Cl$$

which comprises reacting monovinylacetylene with a molecular excess of hydrogen chloride, the reaction taking place in the presence of an aqueous catalyst containing a substantial amount of cuprous chloride.

16. The process of preparing a compound having the formula:

$$CH_3CCl=CH-CH_2Cl$$

which comprises reacting chloro-2-butadiene-1,3 with hydrogen chloride in the presence of an aqueous catalyst containing a substantial amount of cuprous chloride.

17. The process of claim 5 in which the hydrogen halide is in the anhydrous form.

18. The process of claim 5 in which the hydrogen halide is in the liquid anhydrous form.

19. The process of claim 5 in which the hydrogen halide is in the liquid anhydrous form and superatmospheric pressure is used.

20. The process of claim 5 in which the temperature is above 20° C.

21. The process of preparing a compound having the formula:

$$CH_3-CX=CH-CH_2X$$

in which X is a halogen atom, which comprises reacting a halogen-4-butadiene-1,2 with a hydrogen halide.

22. The process of preparing a compound having the formula:

$$CH_3-CX=CH-CH_2X$$

in which X is a halogen atom, which comprises reacting a halogen-4-butadiene-1,2 with a hydrogen halide in the presence of an aqueous catalyst containing a substantial amount of a cuprous halide.

23. The process of preparing a compound having the following formula:

$$CH_3CCl=CH-CH_2Cl$$

which comprises reacting chloro-4-butadiene-1,2 with hydrogen chloride.

24. The process of preparing a compound having the formula:

$$CH_3CCl=CH-CH_2Cl$$

which comprises reacting chloro-4-butadiene-1,2 with hydrogen chloride in the presence of an aqueous catalyst containing a substantial amount of cuprous chloride.

25. The process of claim 22, characterized in that the reaction takes place in an aqueous medium.

WALLACE H. CAROTHERS.
ARNOLD M. COLLINS.